Jan. 2, 1945.  A. BOYNTON  2,366,174
PRESSURE REGULATOR
Filed Sept. 13, 1941  3 Sheets-Sheet 2

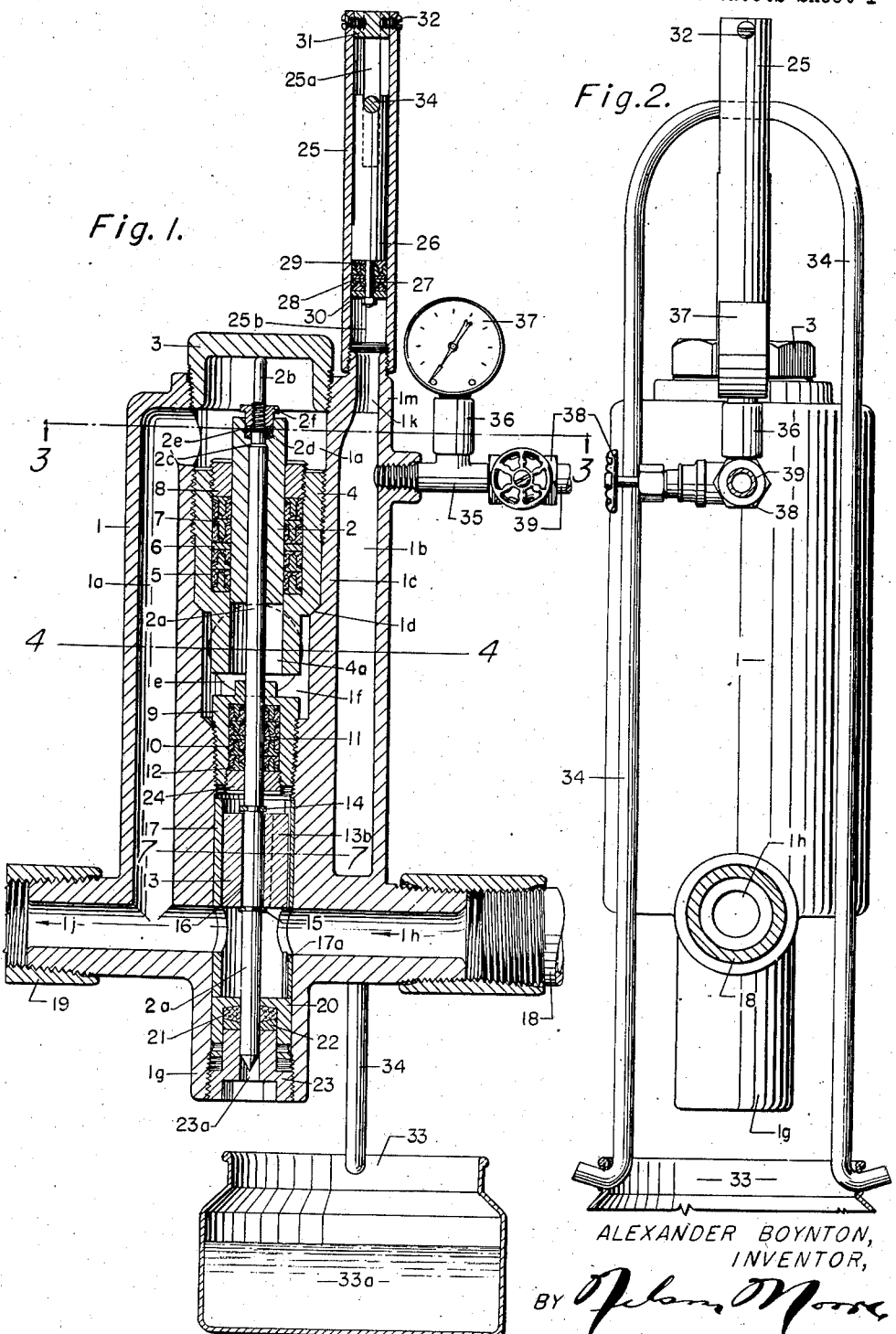

ALEXANDER BOYNTON,
INVENTOR,
BY
ATTORNEYS.

Jan. 2, 1945.   A. BOYNTON   2,366,174
PRESSURE REGULATOR
Filed Sept. 13, 1941   3 Sheets-Sheet 3

Inventor,
ALEXANDER BOYNTON,
By Albert E. Dieterich,
Attorney.

Patented Jan. 2, 1945

2,366,174

UNITED STATES PATENT OFFICE 2,366,174

PRESSURE REGULATOR

Alexander Boynton, San Antonio, Tex.; Sida S. Martin, executrix of said Alexander Boynton, deceased Application September 13, 1941, Serial No. 410,782

8 Claims. (Cl. 50—36)

My invention relates to pressure regulators.

The principal object is to provide a regulator which may be adjusted to reduce a relatively high pressure source of intake pressure fluid to a constant low pressure discharge value by varying the force of pressure fluid confined within a compartment having no communication with either the intake or discharge fluid.

Another object is to govern the pressure reduction by means of a piston which will be more durable in service than diaphragms which are commonly employed in such devices.

Another object is to provide a regulator adapted to an unusually great range of pressures.

A still further object is to accomplish a constant predetermined reduced pressure regardless of temperature variations.

In accomplishing the foregoing objects I employ a piston within a cylinder, the piston being in contact with the regulated low pressure at one end and with an isolated supply of pressure fluid at the other end, said isolated pressure fluid being variable to co-act with the piston and low pressure in reducing the high pressure to approximately equal that of the isolated pressure, the flow of pressure fluid through the regulator being controlled by a valve operated by the piston, all of which will more fully appear from the following specification and accompanying drawings, in which Fig. 1 is a longitudinal section through the preferred embodiment.

Fig. 2 is an outside view of the regulator shown in Fig. 1 rotated 90 degrees from right to left.

Figure 3:
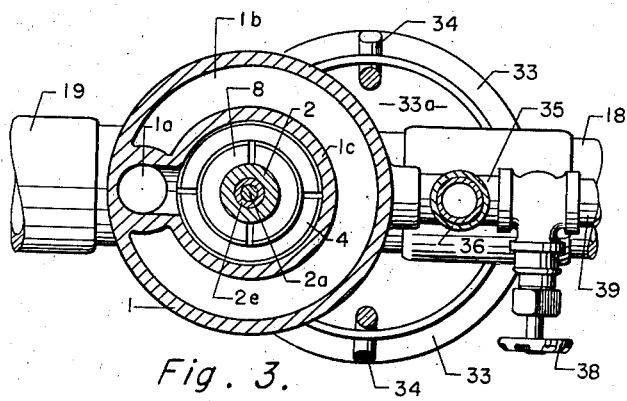
Fig. 3 is a cross section on the line 3—3, Fig. 1.

Referring to Fig. 1, the outer shell or body 1 has connection with the high pressure intake line 18 and with the low pressure discharge line 19. Communication between the passages 1h and 1j is controlled by the valve 13.

The inner shell 1c has an annular seat 1d upon which the cylinder 4 is hermetically seated by being screwed tightly into the shell.

The piston 2 which is slidable within the axial bore 4a of the cylinder 4 is surrounded by the U cups 5 having within them the expander rings 7. The upper pair of cups face upward and the lower pair face downward, the pairs being separated by the spacer ring 6. The retainer ring 8 through which the piston 2 is slidable closes the upper end of the annular recess housing the U cups, their expander rings, and spacer ring within the cylinder 4.

The cup retainer 9, having threaded engagement within the inner shell 1c below the inner chamber 1f, houses the U cups 10 having within them the expander rings 12. The upper pair of these cups face upward and the lower pair face downward. The spacer ring 11 separates these pairs of cups which are secured in place by the ring 24 threadedly engaged within the cup retainer 9. The valve carrier rod 2a is closely received axially through the piston 2 and has an upward extension 2b and an annular shoulder engaged upon the seat 2c of the piston by force of the gland nut 2f engaging upon the gland ring 2e and compressing the packing 2d to prevent leakage between the piston 2 and the rod 2a. This rod extends downward through the cup retainer 9, the cups 10, the ring 24, and to within the tubular extension 1g of the outer shell 1. Within the latter extension, the liner 17 is pressed and has lateral openings registering with the passages 1h and 1j. This liner, which may be of a fine grained metal such as Monel, has a polished inner surface upon which the valve 13 is slidable in controlling the discharge passage 1j. Said valve having the clearance 16 over the rod 2a, is loosely retained thereon by the snap rings 14 and 15 fitting within annular recesses about the rod 2a at opposite ends of the valve. These snap rings have slight clearance with the valve, the snap ring 14 being somewhat wider than the snap ring 15 in order that it may be forced over the lower end of the rod without engaging within the narrower recess for the ring 14.

Figure 7:
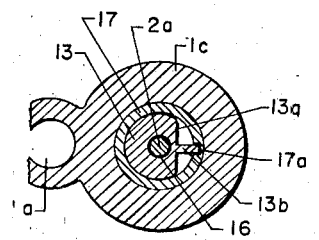
Fig. 7 is a cross section on the line 7—7, Fig. 1.

The valve 13 has a flat outer surface 13a from which the longitudinal tongue 13b extends and is slidable within the internal longitudinal slot 17a of the liner 17 (see Fig. 7) to restrain the valve 13 from rotation upon the rod 2a and thus maintain the valve in proper position to close the passage 1j as will be explained under Operation.

The packing housing 20 which may be pressed into the extension 1g and landed upon the liner 17, contains the packing 21 and the gland 22 which compresses this packing by force of the sleeve 23 having threaded engagement within the extension 1g, the rod 2a being slidable through the housing 20, the packing 21, the gland 22, and through the axial opening 23a of the sleeve 23.

The plug 3, hermetically closing the shell 1, is engaged by the upper extension 2b of the rod 2a in the upper position of the piston 2 and the valve 13 in which position the valve is open as appears in Fig. 1. Downward travel of the piston is arrested by the cup retainer 9 when the valve 13 is closed.

Figure 4:
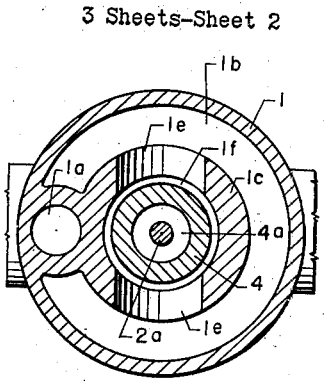
Fig. 4 is a cross section on the line 4—4, Fig. 1.
Figure 5:
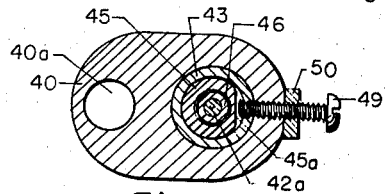
Fig. 5 is a cross section on the line 5—5, Fig. 6.

The low pressure chamber 1a communicates between the discharge passage 1j and the upper end of the piston 2. The isolated chamber 1b has communication with the inner chamber 1f via the ports 1e (see Fig. 4).

The pressure equalizing cylinder 25 which is secured upon an upwardly extending boss 1m of the shell 1 slidably receives the equalizing piston 26 having the lower extension 27 around which the U cups 28 and the spacer rings 29 are held in place by the cup retainer ring 30 secured upon said extension. The isolated chamber 1b and the auxiliary chamber 25b have communication through the opening 1k.

The T 35 has connection with the shell 1, the nipple 36, and the needle valve 38, thereby placing the chamber 1b in communication with the needle valve and the pressure gauge 37 secured upon the nipple 36.

The bail 34 supports the weight bucket 33 and is slidable in the opposed slots 25a of the pressure equalizing cylinder 25. This bail is supported in a recess across the upper end of the equalizing piston 26. The lowermost position of the latter piston is determined by the engagement of the ring 30 upon the boss 1m and the uppermost position of this piston is limited by the plug 31 secured in the cylinder 25 by the screws 32.

The force which the weight bucket 33 exerts upon the piston 26 may be adjusted by varying the value of the weight 33a within the bucket.

Pressure fluid of a value somewhat greater than that which it is desired to maintain in the low pressure discharge line 19 is placed in the isolated chamber 1b. This may be done through the nipple 39, the valve 38 serving to confine such fluid.

The weight 33a will be of such force as to cause the piston 26 to balance with and float upon the fluid confined within the chamber 1b. Normally the distance between the cup retainer ring 30 and the boss 1m below the piston is approximately equal to the distance between the upper end of the piston and the plug 31 in order that this piston may travel upward or downward in response to expansion and contraction of the fluid within the chamber 1b and thereby maintain a constant pressure within that chamber.

*Operation, Fig. 1*

High pressure fluid within the line 18 and the passage 1h passes under the valve 13 and into the discharge passage 1j. A portion of this fluid enters the chamber 1a and contacts the upper end of the piston 2. As soon as this pressure slightly exceeds the value of that confined within the isolated chamber 1b and contacting the lower end of the piston via the ports 1e, the chamber 1f, and the bore 4a, the piston will be forced downward and will close the valve 13.

When the pressure within the discharge line 19 diminishes slightly below that within the chamber 1b, the piston will be forced upward again; thereby opening the valve far enough to maintain a constant pressure within the discharge line approximately equal to that within the chamber 1b.

The valve carrier rod 2a being of much smaller diameter than that of the piston and having its lower end exposed to atmospheric pressure in the axial opening 23a, it is apparent that the upper end of the piston 2 will be of somewhat greater effective area than the lower end. Consequently, the pressure within the chamber 1b should be proportionately greater than that to be maintained within the discharge line 19.

The side clearance 16 between the rod 2a and the valve 13 and the slight end clearance which the valve has with the snap rings 14 and 15 afford freedom for the valve to close the passage 1j by force of the high pressure within the passage 1h when the valve is in its lowermost position, that being when the piston 2 is engaged upon the cup retainer 9.

Two of the U cups 5 and 10 face in opposite direction from the others, so that pressure fluid may not escape from or intrude into the isolated chamber 1b due to leakage around the piston 2 or the rod 2a.

If the regulator should be subjected to great changes in temperature, it is apparent that the value of the fluid confined in the chamber 1b would vary accordingly. The equalizing or floating piston 26 will rise when this fluid expands and will descend when it contracts; thereby maintaining a constant value of the fluid discharged into the line 19, regardless of temperature changes to which the regulator may be subjected.

Manifestly, the regulator may be quickly adjusted to discharge fluid of any desired value by changing the pressure within the isolated chamber 1b.

It will be understood that a single or multiple diaphragm may be secured within the cylinder 4 as a full equivalent of the piston shown and that either form of diaphragm may be employed to actuate the rod 2a.

Figures 6, 8:
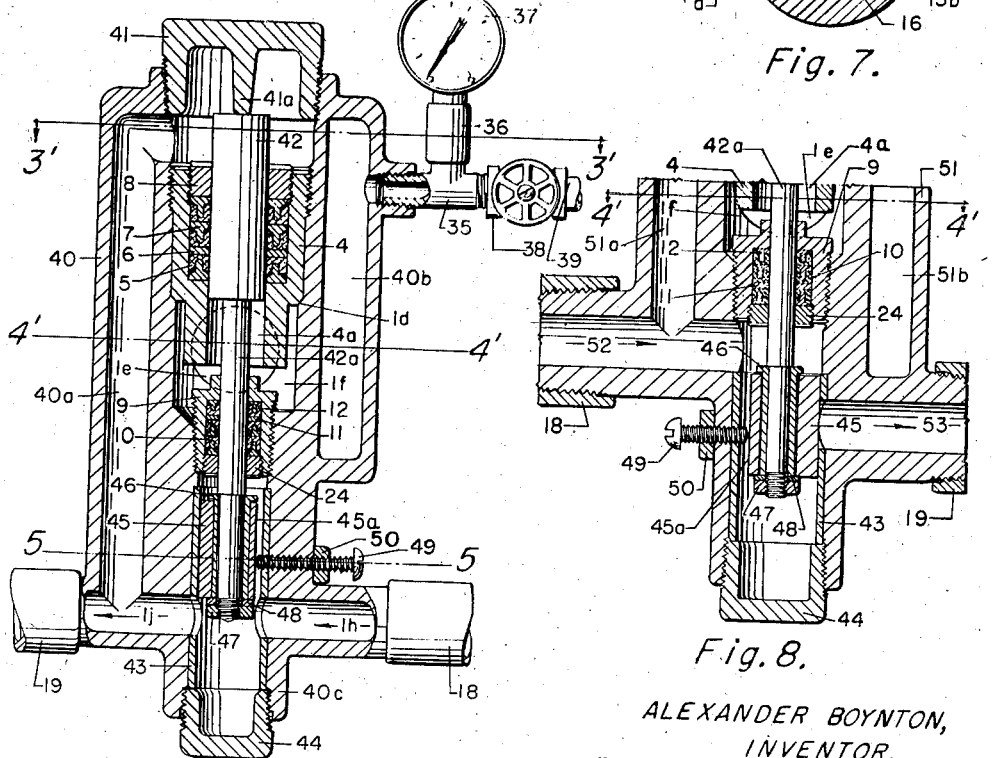
Fig. 6 is a longitudinal section through a modified construction.
Fig. 8 is a partial longitudinal section through another modified construction, the unshown portion of the construction in Fig. 8 being the same as in Fig. 6 above the section line 4'—4'.

In Fig. 6, illustrating the first modified construction, the equalizing means for preventing temperature changes from affecting the discharge pressure is omitted and the piston movements are controlled entirely by pressure obtaining within the device.

Members bearing the same reference characters in Figs. 1 and 6 will be understood as being of similar form and purpose.

The sections 3'—3' and 4'—4' in Fig. 6 are primed to distinguish them from the very similar sections 3—3 and 4—4 in Fig. 1.

The shell 40 has the low pressure chamber 40a communicating between the low pressure passage 1j and the upper end of the piston 42. This piston is slidable through the U cups 5, the retainer ring 8, and in the axial bore 4a of the cylinder 4, as is the similar piston in Fig. 1. The depending rod-like extension 42a of the piston 42 is slidable through the U cups 10 and the members 9 and 24, the two sets of U cups being to prevent leakage into or out of the isolated chamber 40b which may be supplied with pressure fluid through the valve 38 and the nipple 39.

The liner 43 which may be a fine grained metal having a polished inner surface conforming to the valve 45 and lateral openings registering with the passages 1h and 1j, may be pressed in as shown.

The sleeve 46, loosely received over the lower end of the extension 42a and landed upon a shoulder thereon, has an upper flange having some clearance with the valve 45 which is secured over the sleeve by the nut 47 upon the lower end of the extension 42a, the washer 48 being engaged between the sleeve and nut. This valve has a flat surface 45a which has slight clearance with the end of the screw 49 in order to prevent rotation of the valve and constantly maintain it in position to close the passage 1j when the piston is forced downward. The screw 49 having threaded engagement through the shell 40, may be locked in proper position by the nut 50.

The boss 40c of the shell 40 is closed by the depending plug 44. The plug 41, which closes the upper end of the shell 40, has a landing post 41a to arrest the upward movement of the piston 42 when the valve 45 is open as in Fig. 6.

Operation, Fig. 6

The isolated chamber 40b should be charged with pressure fluid of somewhat less value than that to be discharged into the line 19. Pressure acting upon the upper end of the piston 42 is opposed by high pressure from the line 18 and by the isolated pressure fluid in the chamber 40b.

If the high pressure in the line 18 should vary greatly, obviously such variations will prevent exact predetermination of the reduced pressure in the line 19. This fact prevents the device illustrated in Fig. 6 from providing the same degree of accuracy obtainable with the device illustrated in Fig. 1.

In Fig. 8, illustrating a second modified construction, the mechanism is the same as in Fig. 6 above the line 4'—4', the shell 51 in Fig. 8 being regarded as a downward continuation of the shell 40 in Fig. 6.

It will be noted that the passages 52 and 53 are offset and that the valve 45 is normally closed over the passage 53 which becomes the low pressure fluid discharge conduit, while the passage 52 transmits the high pressure fluid which thus contacts the upper end of the piston.

Pressure fluid of somewhat less value than that supplied to the passage 52 and the chamber 51a is confined within the isolated chamber 51b.

Operation, Fig. 8

The high pressure acting upon the piston 42 (see Fig. 6) is partially neutralized by the high pressure acting under the extension 42a. The difference between these forces develops the power which moves the piston downward against the pressure fluid in the chamber 51b.

It will be understood that references to directions in this specification refer to the device as positioned in the drawings, it being understood that in operation the devices illustrated in Figs. 6 and 8 will function in any position.

Figure 9:
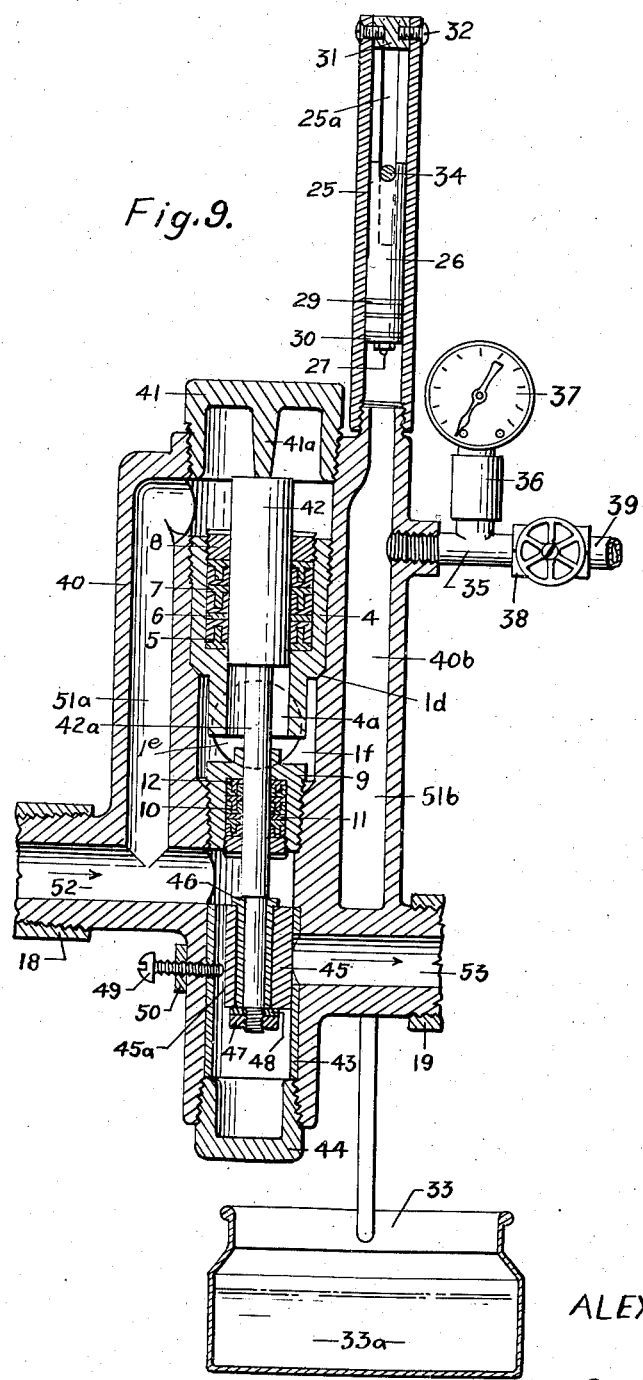
Fig. 9 is a view similar to Fig. 1 combining the pressure equalizer of Fig. 1 with the structure disclosed in Fig. 8.

Fig. 9 is a view similar to Fig. 1 but combining the pressure regulator of Figs. 1 and 6 with the structure of Fig. 8. Those parts in Fig. 9 which are like those in Figs. 1, 6 and 8 bear the same reference characters. The operation of this form of the invention will be clear without further description.

It is apparent that many minor changes can be made in the constructions illustrated and that equivalents can be substituted for parts shown; and I reserve the right to make such changes and substitutions within the scope and purpose of the stated objects and appended claims.

Where introductory expressions and functional statements are employed in the claims to follow, it will be understood that such expressions and statements relate to the best presently known mode of applying the invention, and are not to be regarded as limitations upon the claims, which contemplate that the invention will be applied to other and various uses.

I claim:

1. In a pressure regulator: an outer shell having an intake and a discharge passage; a liner in said shell, said liner having openings registering with said passages; a low pressure chamber in said shell, said chamber having communication with said discharge passage; an isolated chamber within said shell; an inner chamber within said shell communicating with said isolated chamber; an inner shell within said outer shell; a cylinder within said inner shell and hermetically sealed therewith; a piston within said cylinder and slidable hermetically therein; a valve carrier rod on said piston; a valve on said rod, said valve being slidable in said liner and arranged to close said discharge passage at a predetermined fluid force within said low pressure chamber; means exposing one end of said rod to atmospheric pressure; a pressure equalizing cylinder upon said outer shell; an auxiliary chamber therein; an equalizing piston slidable in said auxiliary chamber; and means to adjust the force on said equalizing piston to maintain a constant pressure within said auxiliary chamber.

2. In a pressure regulator; an outer shell having intake and discharge passages and a low pressure chamber, said chamber having communication with said discharge passage, said shell also having an isolated chamber and an inner chamber, said inner chamber having communication with said isolated chamber; an inner shell within said outer shell; a cylinder within said inner shell and hermetically sealed therewith; a piston within said cylinder and slidable hermetically therein; a valve carrier rod connected to said piston; a valve on said rod, said valve being slidable in said outer shell and adapted to close said discharge passage at a predetermined fluid force within said low pressure chamber; means exposing one end of said rod to atmospheric pressure; a pressure equalizing cylinder upon said outer shell; an auxiliary chamber therein; an equalizing piston slidable in said auxiliary chamber; and means to adjust the force on said equalizing piston to maintain a constant pressure within said auxiliary chamber.

3. As a pressure regulator: a shell arranged to be connected into a conduit for fluid under pressure, said shell having a passage therethrough and a chamber therein, said chamber being charged with compressed gas of a desired pressure; a piston in said shell, one end of said piston being in contact with said compressed gas and having an extension; a second chamber in said shell, said second chamber providing communication between said passage and the other end of said piston; a valve connected to said extension of the piston, said valve being arranged to open and close said passage; means exposing said extension to atmospheric pressure; means controlling the gas pressure within said first chamber; and constant weight means controlling said gas pressure.

4. In a pressure regulator: an outer shell having connections for a high pressure intake line and a low pressure discharge line, said shell having an intake and a discharge passage therein, said last passage being in offset relation to said intake passage, said shell also having a high pressure chamber in communication with said intake passage, an isolated chamber, and an inner chamber, the walls of said last two chambers having a port communicating therebetween; a liner opposite said discharge opening in said shell, said liner having an opening registering with said discharge passage; an inner shell within said outer shell; a cylinder within said inner shell and hermetically sealed therewith; a piston within said cylinder and slidable hermetically therein; a valve connected to said piston, said valve being slidable in said liner and arranged to close said discharge passage at a predetermined fluid pressure within said high pressure chamber; a pressure equalizing cylinder upon said outer shell, said cylinder having an auxiliary chamber therein; an equalizing piston slidable in said auxiliary chamber; and means to force said equalizing piston to maintain a substantially constant pressure within said auxiliary chamber.

5. In a pressure regulator: an outer shell having a high pressure chamber, a low pressure chamber, and an auxiliary chamber, which auxiliary chamber is out of communication with said high pressure chamber and said low pressure chamber; an inner shell provided with two piston slideways in axial alignment; a valve carrier rod; two pistons mounted in spaced relation on said rod, one of said pistons constituting a slide valve, one end of the other piston being in communication with said low pressure chamber and the other end of said other piston being in communication with said auxiliary chamber, said high pressure chamber and said low pressure chamber having communicating ports controlled by said slide valve; means for sealing off the first piston from said auxiliary chamber; a fluid in said auxiliary chamber; and means for applying a constant force to the fluid in said auxiliary chamber.

6. In a pressure regulator: an outer shell having a high pressure chamber, a low pressure chamber, and an auxiliary chamber, which auxiliary chamber is out of communication with said high pressure chamber and said low pressure chamber; an inner shell provided with two piston slideways in axial alignment; a valve carrier rod, one end of which is exposed to atmosphere; two pistons mounted in spaced relation on said rod, one of said pistons constituting a slide valve, one end of the other piston being in communication with said low pressure chamber and the other end of said other piston being in communication with said auxiliary chamber said high pressure chamber and said low pressure chamber having communicating ports controlled by said slide valve; means for sealing off the first piston from said auxiliary chamber; a fluid in said auxiliary chamber; and means for applying a constant force to the fluid in said auxiliary chamber.

7. In a pressure regulator: an outer shell having a high pressure chamber, a low pressure chamber, and an auxiliary chamber, which auxiliary chamber is out of communication with said high pressure chamber and said low pressure chamber; an inner shell provided with two piston slideways in axial alignment; a valve carrier rod; two pistons mounted in spaced relation on said rod, one of said pistons constituting a slide valve, one end of the other piston being in communication with said low pressure chamber and the other end of said other piston being in communication with said auxiliary chamber; means for sealing off the first piston from said auxiliary chamber; a fluid in said auxiliary chamber; and means for applying a constant force to the fluid in said auxiliary chamber, said last named means including a pressure equalizing cylinder, an equalizing piston in said cylinder, and an adjustable force applying means operatively connected to said equalizing piston.

8. In a pressure regulator: an integral body comprising an outer shell having a high pressure chamber, a low pressure chamber, and an auxiliary chamber, which auxiliary chamber is out of communication with said high pressure chamber and said low pressure chamber, said high pressure chamber and said low pressure chamber having communicating ports, said integral body also having a longitudinal passage; a cylinder removably secured in said longitudinal passage and having an axial bore; a liner held in said longitudinal passage and spaced from said cylinder; a valve carrier rod; a piston on said rod and operating in said axial bore; a piston valve on said rod having a loose sliding fit in said liner and controlling the communicating ports of said high pressure chamber and said low pressure chamber; a cup retainer assembly secured in said passage between said liner and said cylinder and spaced from said cylinder, the space between said cylinder and said retainer assembly being in communication with said auxiliary chamber; and means to establish a pressure of a constant value in said auxiliary chamber.

ALEXANDER BOYNTON